United States Patent [19]

Isenga et al.

[11] Patent Number: 5,613,630
[45] Date of Patent: Mar. 25, 1997

[54] DROP LOOP GARMENT HANGER

[75] Inventors: Gordon D. Isenga, Holland; Russell O. Blanchard, Zeeland, both of Mich.

[73] Assignee: Batts, Inc., Zeeland, Mich.

[21] Appl. No.: 370,599

[22] Filed: Jan. 10, 1995

[51] Int. Cl.⁶ .......................... A47G 25/18; A47G 25/48
[52] U.S. Cl. ................................. 223/88; 223/95
[58] Field of Search .................. 223/85, 88, 92, 223/95; D6/315, 328; 264/328.12; 211/113, 86

[56] References Cited

U.S. PATENT DOCUMENTS

| | | | |
|---|---|---|---|
| 2,046,654 | 7/1936 | Rosen | 223/DIG. 4 |
| 2,456,374 | 12/1948 | Carter | 223/DIG. 4 |
| 4,965,030 | 10/1990 | Thorn | 264/328.12 |
| 5,029,739 | 7/1991 | Blanchard et al. | 223/85 |
| 5,328,068 | 7/1994 | Shannon | 223/DIG. 4 |
| 5,421,494 | 6/1995 | Kolton et al. | 223/85 |

FOREIGN PATENT DOCUMENTS

| | | | |
|---|---|---|---|
| 151872 | 10/1955 | Sweden | 223/DIG. 4 |

*Primary Examiner*—Bibhu Mohanty
*Attorney, Agent, or Firm*—Baker & McKenzie

[57] ABSTRACT

An injection molded plastic hanger including an upper hanger member and a lower hanger member having a loop segment by which to hang from the upper hanger member. The loop segment is "closed" by the overlapping placement of two fingerlike segments extending from opposite ends of the loop. The two segments are held together in the proper position by a thin film of plastic which is located between them. The overlapping design of the fingerlike segments alleviates the formation of any weld lines within the loop segment which are substantially perpendicular to the tensile forces which are imposed upon the loop segment as the hanger is used as intended.

6 Claims, 2 Drawing Sheets

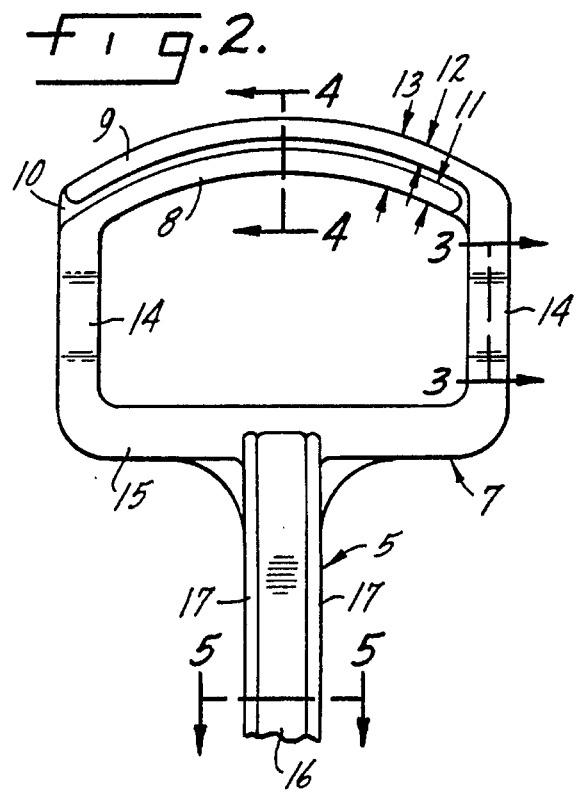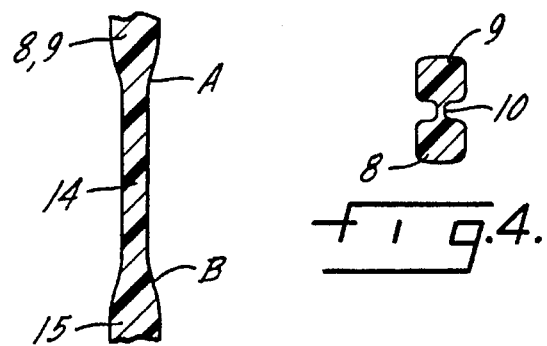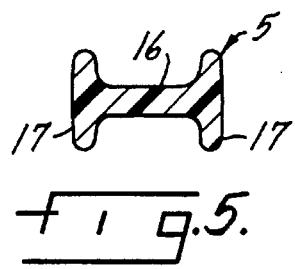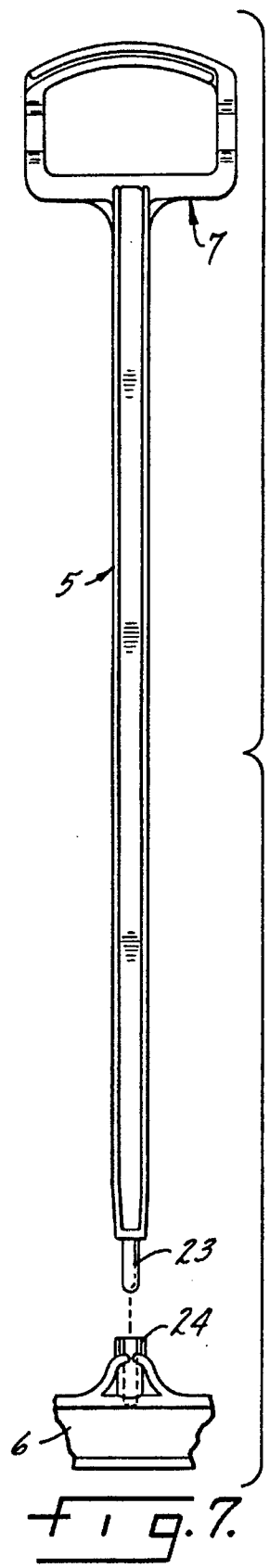

5,613,630

DROP LOOP GARMENT HANGER

The present invention relates generally to two-piece garment hangers and, more specifically, to an improved drop loop garment hanger assembly in which a loop-shaped extension of a pant/skirt clamp member is placed over the hook of a standard horizontal hanger member to allow the drop loop hanger extension to be suspended therefrom.

BACKGROUND OF THE INVENTION

It is often desirable to display an upper body garment upon an upper hanger while simultaneously displaying a lower body garment upon a lower hanger which "hangs" from the upper hanger. Accordingly, a variety of hanger arrangements have been introduced into the garment industry—one of the more popular arrangements being the drop loop hanger.

The drop loop hanger employs a two-piece construction. The first "upper" piece is typically a standard, shoulder-shaped hanger for use with upper body clothing. The second "lower" piece includes an elongated vertical body and a lower clamping member to support a piece of lower body clothing, such as pants. The upper end of the elongated body is formed into a "loop" which may be placed over the hook member of the upper hanger and suspended therefrom, and subsequently support any garment which is attached to the lower hanger.

The drop loop hanger, and similar variations, has proven to work quite well in the display and merchandising of two-piece clothing outfits. However, the construction of the hanger has shown a certain structural weakness whereby its use is often limited to light and medium weight clothing. Specifically, the plastic injection molding process employed to form the lower hanger invariably leaves a "weld line" at some location within the loop section of the suspended hanger section, giving such loop section a limited tensile strength.

In injection molding, weld lines are the result of the joining of plastic materials which are flowing from different directions during the injection process. Very frequently the adhesive joint which is formed between oppositely flowing materials causes a weak area in the molded part. Indeed, such weld lines are inherent in all ring-shaped injection molded products since the injected plastic must, at some point around the ring, reconnect with itself. The weakness results from the cooling of the materials as they flow from opposite directions toward their joining point. By the time the two masses of plastic material reach their joining point, they have lost the capability to adequately intermingle in order to form a bond of acceptable strength.

A weld line in an injection molded part, such as the drop loop hanger, is much the same as a glued butt joint at the end of two pieces of wood. With no fibers crossing the joint, it has an inherently weak tensile strength and is susceptible to being pulled apart by tensile forces. The drop loop hanger, therefore, is susceptible to breakage at the weld line in its loop section if the hanger is used with heavier weight clothing or if it is handled roughly.

In light of the structural deficiencies associated with the current drop loop hangers in the garment industry, what is needed in this field of art is a drop loop hanger which, quite simply, can be manufactured without the presence of weld lines being disposed at locations at which they are susceptible to being pulled apart by the weight forces (tensile forces) imposed upon them.

SUMMARY OF THE INVENTION

The improved drop loop hanger of the present invention is manufactured through an injection molding process whereby the loop section of the lower hanger does not contain any straight-through weld lines; that is, weld lines which are perpendicular or substantially perpendicular to the tensile forces imposed on the loop section of the hanger as the hanger is used to support an article of clothing. Usage of the reinforced and uniquely designed loop section is more assured than that of drop loop hangers of the prior art because of the increased ability of the improved hanger to be used with heavyweight clothing and to be handled in a rougher manner.

The basic components of the present invention include an upper garment hanger having a shoulder-shaped cross bar and a lower garment hanger having a loop section by which the lower hanger is hung from the upper hanger. The top portion of the loop section is actually formed by the adjacent positioning, one above the other, of two oppositely pointing finger segments which are merely the extensions of the lower portions of the loop section. The two finger segments are held in place by a thin film of molded plastic located between them. Once the loop section is hung over the upper hanger, the weight of the garment placed upon the lower hanger is borne by the combination of the widths of the two overlapping finger segments. The separation force imposed on the weld line places the weld line in shear which results in a greater resistance to separation than can be obtained from a butt weld under the same load.

The particular design of the preferred embodiment described herein completely avoids the formation of any weld lines which are oriented perpendicularly or substantially perpendicularly to the direction of the tensile forces present in the loop section during the hanger's use. Thus, a weld line is created which is substantially parallel to the direction of the forces imposed on the loop when the hanger is in use. Although a greater total joint area may be present than in prior art constructions, this is not a requirement. Given the overlapping nature of the two finger segments comprising the upper portion of the loop section, the newly-formed weld line provides shearing resistance to separation forces. Such shearing resistance, as those skilled in the art will appreciate, is generally much greater than that of a butt weld junction.

BRIEF DESCRIPTION OF THE DRAWING

For a more complete understanding of this invention, reference should now be made to the embodiment illustrated in greater detail in the accompanying drawing and described below. In the drawing:

FIG. 2 is a front view of the loop section of the lower hanger to a larger scale;

FIG. 3 is a cross section taken substantially along the line 3—3 of FIG. 2;

FIG. 4 is a cross section taken sustantially along the line 4—4 of FIG. 2;

FIG. 5 is a cross section taken substantially along the line 5—5 of FIG. 2;

FIG. 6 is a side view of the loop section and the elongated body of the lower hanger of an alternative embodiment;

FIG. 7 is an exploded front view of the loop section and the elongated body of the lower hanger of the alternative embodiment;

Figures 1, 8, 9:
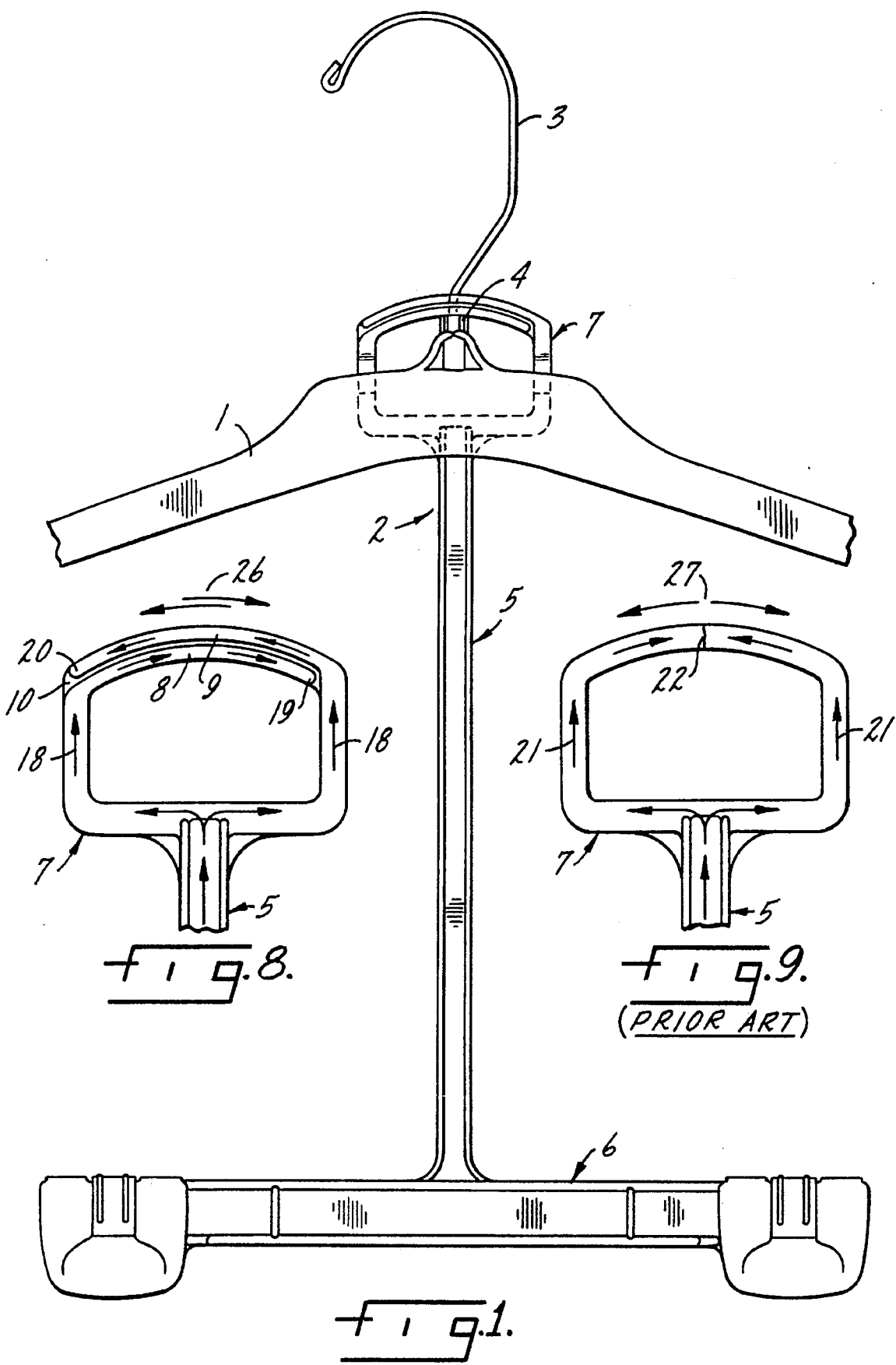
FIG. 1 is a front view of the present invention showing the lower hanger engaged to the upper hanger in its suspended position.
FIG. 8 is a front view of the loop section of the present invention indicating the flow of injection molded plastic during formation.
FIG. 9 is a front view of the loop section in a prior art construction indicating the flow of injection molded plastic upon formation as well as the resulting weld line.

Notice must be taken that the figures are not necessarily to scale and that the embodiments are sometimes illustrated by phantom lines and diagrammatic representations. In certain instances, details which are not necessary for an understanding of the present invention, but which render other details difficult to perceive, may have been omitted. It should be understood, of course, that the invention is not necessarily limited to the particular embodiments illustrated herein.

DETAILED DESCRIPTION OF THE DRAWING

FIG. 1 shows a front view of the present invention with the lower hanger 2 engaged to the upper hanger 1 in a suspended position. The upper hanger i is typical of a variety of standard shoulder-shaped hangers having a hook element 3 and a centrally located boss 4, here a sizer boss, into which the hook element 3 may be inserted. The primary components of the lower hanger 2 include an elongated body 5, a pant/skirt clamping member 6 and a loop segment 7.

The standard method of use of the present invention, as well as that in the prior art, requires that the loop segment 7 be placed over the hook element 3 such that it comes to rest upon an upper edge of the boss 4 and allows the lower hanger 2 to be vertically suspended downward therefrom. Such arrangement substantially ensures that the pant/skirt clamping member 6 remains a spaced distance below, and in the same plane as, the upper hanger 1. Accordingly, the drop loop hanger arrangement may be used to simultaneously display both pieces of a two-piece outfit of clothing.

The loop section 7 of the lower hanger 2 is shown in FIGS. 2 and 5. The loop segment 7 is a molded extension of the elongated body 5 and is specifically comprised of a lower base section 15, a narrow side section 14, a first upper loop segment 8 and a second upper loop segment 9, said loop segments being joined by a thin plastic section 10. The loop design of the present invention's loop segment 7 is unique in that the second loop segment 9 overlaps the first loop segment 8 along substantially its entire length. These segments are held together by the thin plastic section 10 best seen in FIG. 4. As can be seen in 2, first loop segment 8, having a thickness 11, and second loop segment 9, having a thickness 12, combine to create an overall upper loop thickness 13 which is approximately equal to the thickness of the lower base section 15 and hence no more material, and usually less material, is required to form the upper loop than the lower loop section 15.

FIG. 3 illustrates the narrow side section 14 which is positioned between the lower base section 15 and first and second finger segments 8 and 9 and which allows flexibility, particularly at points A and B, between the loop segment 7 and the elongated body 5 so that the garment on member 6 can hang directly, or nearly directly, beneath hook 3.

FIG. 5 exemplifies the cross-beam shape of the elongated body 5 which includes a single central member 16 and two edge members 17.

FIG. 6 is a side view of the loop segment 7 of an alternative embodiment and elongated body 5 of the lower hanger 2. The preferred embodiment allows flexibility within the loop segment 7, particularly at points A and B, such that the elongated body 5 may hang in a substantially vertical plane and directly, or nearly directly, beneath hook 3.

FIG. 7 illustrates an optional embodiment of the present invention wherein the elongated body 5 is separately connected to the pant/skirt clamping member 6 of the lower hanger 2. As indicated, the lower end of the elongated body 5 terminates in a plug member 23 which may be adhesively connected to the boss member 24 which projects upwardly from the pant/skirt clamping member 6. Such an arrangement enables a variety of elongated bodies 5, each having different lengths, to be inserted into a single style of pant/skirt clamping member 6. Each of the elongated body 5 and the pant/skirt clamping member 6 would be manufactured through a separate injection molding process in this alternative embodiment.

FIGS. 8 and 9 illustrate the direction of plastic flow during formation of the drop loop hanger of the present invention and the prior art, respectively. During the injection process of the present invention, molten plastic flows from the area of the elongated body 5 into the loop segment 7. As indicated by the arrows in FIG. 8, the primary flow of molten plastic 18 simultaneously travels along opposite sides of the loop segment 7 and then into cavities forming both the first finger segment 8 and second finger segment 9; such primary flows terminating at points 19 and 20, respectively. At the same time, a small amount of plastic seeps out from the primary flows to form the thin plastic section 10 along the overlapping length of first finger segment 8 and second finger segment 9.

It will thus be appparent that in the preferred embodiment described herein, the formation of any weld lines which are oriented perpendicularly or substantially perpendicularly to the direction of the forces imposed upon the loop section 7 during the hanger's use are avoided. Rather, contained within the plastic film 10 is a weld line which is substantially parallel to such forces.

Accordingly, as a load is applied to the drop loop hanger of the present invention, the shearing forces 26 will be imposed upon the substantially parallel weld line which exists within the thin film 10. The amount of shearing force which must be applied to the drop loop hanger in order to overcome the loop section's shearing strength is significantly greater than the amount of tensile force which would rupture a typical butt weld.

Conversely, FIG. 9 shows how the flow of molten plastic 21 in prior art drop loop hangers flows from the elongated body 5 through both sides of the loop segment 7 and joins near the top of the loop segment 7 to form a single, straight-through butt weld line 22 which is perpendicular, or substantially perpendicular, to the tensile forces 27. As there are no fibers which cross weld line 22, this loop segment 7 of the prior art is inherently weak.

Thus, it can be seen that the overlapping of the first finger segment 8 with the second finger segment 9, as indicated in FIG. 8 of the present invention, provides a drop loop assembly which is sturdier than that of the prior art and which does not require significant changes to the existing injection molding production process.

It should be understood that the above-described embodiment is intended to illustrate, rather than limit, the invention and that various modifications could be made thereto without departing from the scope of the invention as defined by the appended claims. Indeed, the loop section of the drop loop hanger could very well be used in conjunction with a hook, a closet rod, or any other means of hanger support. Furthermore, it is within the contemplation of the present invention that the disclosed method of forming a loop section in a molded plastic device apply to other structures—not just hangers—in which a load is applied to such a loop section.

While the present invention has been illustrated in some detail according to the preferred embodiment shown in the foregoing drawing and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. A two-piece plastic garment hanger, said hanger including a shoulder-shaped support bar for the hanging of upper body clothing and a drop loop suspending member for the hanging of lower body clothing, said support bar having an upwardly extending hook element and means for supporting said suspending member located generally at a connection point between said hook element and said support bar, said suspending member having a substantially vertical elongated body positioned between a substantially horizontal pant or skirt holder on a lower end and an improved loop segment on an upper end, said loop segment adapted to be placed over said hook element wherein an upper inner edge of said loop segment engages said means for supporting said suspending member and allows said suspending member to hang vertically downward thereof, the improvement in said loop segment comprising: said loop segment being formed of injection molded plastic without weld lines which are substantially perpendicular to the tensile forces imposed upon said loop segment during said hanger's intended use.

2. The two-piece plastic garment hanger of claim 1, wherein a section of said loop segment is formed by an overlapping combination of a first finger segment and a second finger segment, said first finger segment pointing opposite to and being adjacent to said second finger segment.

3. The two-piece plastic garment hanger of claim 2, wherein said first finger segment is attached by a thin film of injection molded plastic to said second finger segment.

4. A one piece drop loop garment hanger requiring no assembly made from injection molded plastic and used for hanging a piece of lower body clothing from a standard garment hanger, the drop loop garment hanger including a closed, non-separable loop segment and an elongated body member for supporting the piece of lower body clothing, said loop segment being formed to be placed over a hook of a standard garment hanger from which said drop loop hanger may hang subsequently downward, the improvement comprising: the injection molded loop segment having no weld lines which are substantially perpendicular to the tensile forces imposed upon said loop segment during said loop segment's intended use.

5. The drop loop hanger of claim 4, wherein a section of said loop segment is formed by an overlapping combination of a first finger segment and a second finger segment, said first finger segment pointing opposite to and being adjacent to said second finger segment.

6. The drop loop hanger of claim 5, wherein said first finger segment is attached by a thin film of injection molded plastic to said second finger segment.

* * * * *